United States Patent
Yang-Huffman

(12) 
(10) Patent No.: US 7,299,264 B2
(45) Date of Patent: Nov. 20, 2007

(54) SYSTEM AND METHOD FOR MONITORING A CONNECTION BETWEEN A SERVER AND A PASSIVE CLIENT DEVICE

(75) Inventor: Siew-Hong Yang-Huffman, Loveland, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 920 days.

(21) Appl. No.: 10/141,251

(22) Filed: May 7, 2002

(65) Prior Publication Data

US 2003/0212801 A1 Nov. 13, 2003

(51) Int. Cl.
*G06F 15/16* (2006.01)

(52) U.S. Cl. .................. 709/208; 709/201; 709/227; 709/236

(58) Field of Classification Search .......... 709/201, 709/207, 221, 224, 205, 223, 229, 227, 245, 709/204, 203, 217, 219, 230, 231, 208; 340/505; 713/156; 455/423, 452; 379/106, 202; 705/64; 370/248, 354, 401, 257; 375/222, 375/93; 718/102; 715/781; 345/736; 714/17; 717/127

See application file for complete search history.

(56) References Cited

U.S. PATENT DOCUMENTS

| | | | | |
|---|---|---|---|---|
| 5,280,630 A | * | 1/1994 | Wang ................... 455/452.2 |
| 5,386,465 A | * | 1/1995 | Addeo et al. .......... 379/202.01 |
| 5,530,802 A | * | 6/1996 | Fuchs et al. .................. 714/17 |
| 5,657,390 A | * | 8/1997 | Elgamal et al. ............ 713/151 |
| 5,668,857 A | * | 9/1997 | McHale ................... 379/93.07 |
| 5,764,916 A | * | 6/1998 | Busey et al. ................ 709/227 |
| 5,905,476 A | * | 5/1999 | McLaughlin et al. ....... 715/781 |
| 5,941,988 A | | 8/1999 | Bhagwat et al. ............ 713/201 |
| 6,073,177 A | | 6/2000 | Hebel et al. ................ 709/228 |
| 6,160,843 A | * | 12/2000 | McHale et al. ............. 375/222 |
| 6,169,788 B1 | * | 1/2001 | McHale et al. .......... 379/93.14 |
| 6,212,175 B1 | | 4/2001 | Harsch ........................ 370/338 |
| 6,216,163 B1 | | 4/2001 | Bharali et al. .............. 709/227 |
| 6,247,060 B1 | | 6/2001 | Boucher et al. ............ 709/238 |
| 6,266,709 B1 | | 7/2001 | Gish .......................... 709/315 |
| 6,331,983 B1 | * | 12/2001 | Haggerty et al. ........... 370/400 |

(Continued)

OTHER PUBLICATIONS

Monitoring Very High Speed Links—Iannaccone, Diot, Graham, McKeown (2001)☐☐www.aciri.org/vern/imw-2001/imw2001-papers/63.ps.gz.*

(Continued)

*Primary Examiner*—Thong Vu

(57) ABSTRACT

A system and method for monitoring a connection between a server and a passive client device is disclosed. The method comprises continuously monitoring whether an input data stream of an existing connection between the server and the client device is empty, and if so, determining the presence of a request for a new connection between the server and the passive client device, closing the existing connection in response to the presence of the request for new connection, and establishing the new connection. The system comprises a server operable to continuously monitor whether there is a problem in an existing connection between the server and a passive client device, and if so, determining the presence of a request for a new connection between the server and the client device, the server further operable to close the existing connection and establish the new connection between the server and the passive client device.

45 Claims, 1 Drawing Sheet

U.S. PATENT DOCUMENTS

| | | | |
|---|---|---|---|
| 6,343,318 B1 | 1/2002 | Hawkins et al. | 709/219 |
| 6,385,203 B2* | 5/2002 | McHale et al. | 370/401 |
| 6,421,322 B1* | 7/2002 | Koziy et al. | 370/248 |
| 6,427,161 B1* | 7/2002 | LiVecchi | 718/102 |
| 6,434,620 B1* | 8/2002 | Boucher et al. | 709/230 |
| 6,463,457 B1* | 10/2002 | Armentrout et al. | 709/201 |
| 6,526,131 B1* | 2/2003 | Zimmerman et al. | 379/106.09 |
| 6,543,048 B1* | 4/2003 | Kuzemchak et al. | 717/127 |
| 6,615,265 B1* | 9/2003 | Leymann et al. | 709/227 |
| 6,625,648 B1* | 9/2003 | Schwaller et al. | 709/224 |
| 6,630,885 B2* | 10/2003 | Hardman et al. | 340/505 |
| 6,769,019 B2* | 7/2004 | Ferguson | 709/219 |
| 6,775,542 B1* | 8/2004 | Vilander et al. | 455/423 |
| 6,785,708 B1* | 8/2004 | Busey et al. | 709/204 |
| 6,791,950 B2* | 9/2004 | Wu | 370/257 |
| 6,801,940 B1* | 10/2004 | Moran et al. | 709/224 |
| 6,816,455 B2* | 11/2004 | Goldberg et al. | 370/230 |
| 6,829,238 B2* | 12/2004 | Tokuyo et al. | 370/392 |
| 6,832,255 B1* | 12/2004 | Rumsewicz et al. | 709/227 |
| 6,862,625 B1* | 3/2005 | Busey et al. | 709/227 |
| 6,870,834 B1* | 3/2005 | McHale et al. | 370/354 |
| 7,047,288 B2* | 5/2006 | Cooper et al. | 709/223 |
| 7,055,173 B1* | 5/2006 | Chaganty et al. | 726/11 |
| 2001/0031641 A1* | 10/2001 | Ung et al. | 455/456 |
| 2002/0004834 A1* | 1/2002 | Guenther et al. | 709/230 |
| 2002/0026491 A1* | 2/2002 | Mason et al. | 709/207 |
| 2002/0055980 A1* | 5/2002 | Goddard | 709/217 |
| 2002/0093527 A1* | 7/2002 | Sherlock et al. | 345/736 |
| 2002/0133611 A1* | 9/2002 | Gorsuch et al. | 709/231 |
| 2002/0143960 A1* | 10/2002 | Goren et al. | 709/229 |
| 2002/0156756 A1* | 10/2002 | Stanley et al. | 706/47 |
| 2002/0174073 A1* | 11/2002 | Nordman et al. | 705/64 |
| 2002/0174207 A1* | 11/2002 | Battou | 709/223 |
| 2003/0033521 A1* | 2/2003 | Sahlbach | 713/156 |
| 2003/0037163 A1* | 2/2003 | Kitada et al. | 709/236 |
| 2003/0069962 A1* | 4/2003 | Pandya | 709/224 |
| 2003/0126240 A1* | 7/2003 | Vosseler | 709/221 |
| 2003/0154244 A1* | 8/2003 | Zellers et al. | 709/203 |
| 2003/0154306 A1* | 8/2003 | Perry | 709/245 |
| 2003/0200480 A1* | 10/2003 | Beattie | 714/13 |
| 2003/0208541 A1* | 11/2003 | Musa | 709/205 |
| 2004/0081166 A1* | 4/2004 | Stanforth et al. | 370/395.32 |

OTHER PUBLICATIONS

Automatically Generating System Mock Objects—Jalis, Kind (2001) ☐☐www.xpuniverse.com/2001/pdfs/Testing04.pdf.*

Design and Deployment of a Passive Monitoring . . . —Fraleigh, Diot, Lyles, . . . (2001) ☐☐www.ripe.net/pam2001/Papers/talk_02.ps.gz.*

A Network Measurement Architecture for Adaptive Applications—Stemm, Katz, Seshan (2000) ☐☐HTTP.CS.Berkeley.EDU/~stemm/publications/infocom00.ps.gz.*

* cited by examiner

SYSTEM AND METHOD FOR MONITORING A CONNECTION BETWEEN A SERVER AND A PASSIVE CLIENT DEVICE

©Hewlett-Packard Company 2001. A portion of the disclosure of this patent document contains material which is subject to copyright protection. The copyright owner has no objection to the facsimile reproduction by anyone of the patent document or the patent disclosure, as it appears in the patent and trademark office patent file or records, but otherwise reserves all copyright rights whatsoever.

TECHNICAL FIELD OF THE INVENTION

The present invention relates generally to the field of networking, and more particularly to a system and method for monitoring a connection between a server and a passive client device.

BACKGROUND OF THE INVENTION

Some client devices operate in a passive mode and do not accept commands from or provide status information to the servers with which they have established a connection, such as a TCP (Transmission Control Protocol) connection. The communication between the server and the client device is one way only in the direction from the client device to the server. The client device simply transmits relevant data to the server for processing. No information is provided by the client device to the server regarding the status of the client device or the connection between the server and the client device. Thus, the server does not know when the client device or the connection between the server and the client device becomes non-operational. Most TCP implementations allow in-bound connection requests to be stored into a socket connection queue of the server. A new connection request stored in the socket connection queue is not accepted by the server until the currently open connection is explicitly closed. Thus, data that is being transmitted by the client through a new connection that has not been accepted by the server will be lost forever.

Existing systems may include a TCP socket "keepalive" option. When the "keepalive" option is active for a TCP socket and no data has been exchanged across the socket for a period of time, typically two hours, a "keepalive" probe is sent by the server to the client device. The client device may respond to the probe in one of three ways. The client device may respond with an ACK (acknowledged) signal indicating that everything is fine. In such a case, another "keepalive" probe is sent following another two hours of inactivity. Alternatively, the client device may respond with a RST (reset) signal indicating that the client device has crashed and rebooted. In such a case, the socket connection is closed. The third option is that the client device does not respond to the "keepalive" probe. In such a case, it is assumed that the client device has crashed and the socket connection is closed. The period of time after which the "keepalive" probe is then sent to the client device is typically long and is not configurable by a user. As such, a significant amount of data may be lost between two successive "keepalive" probes.

SUMMARY OF THE INVENTION

In accordance with an embodiment of the present invention, a method for monitoring a connection between a server and a passive client device is disclosed. The method comprises continuously monitoring whether an input data stream of an existing connection between the server and the passive client device is empty, and if so, determining the presence of a request for a new connection between the server and the passive client device, closing the existing connection in response to the presence of the request for new connection, and establishing the new connection between the server and the passive client device.

In accordance with another embodiment of the present invention, a method for monitoring a connection between a server and a passive client device is disclosed. The method comprises continuously monitoring whether there is a problem in an existing connection between the server and the passive client device, and if so, determining the presence of a request for a new connection between the server and the passive client device, closing the existing connection in response to the presence of the request for new connection, and establishing the new connection between the server and the passive client device.

In accordance with a further embodiment of the present invention, a system for monitoring a connection is disclosed. The system comprises a server operable to continuously monitor whether there is a problem in an existing connection between the server and a passive client device, and if so, determining the presence of a request for a new connection between the server and the passive client device, the server further operable to close the existing connection and establish the new connection between the server and the passive client device.

BRIEF DESCRIPTION OF THE DRAWINGS

For a more complete understanding of the present invention, the objects and advantages thereof, reference is now made to the following descriptions taken in connection with the accompanying drawings in which.

DETAILED DESCRIPTION OF THE DRAWINGS

Figure 1:
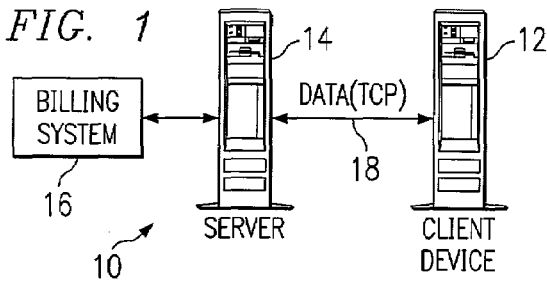
FIG. 1 is a block diagram of a client-server network in accordance with an embodiment of the present invention.
Figure 2:
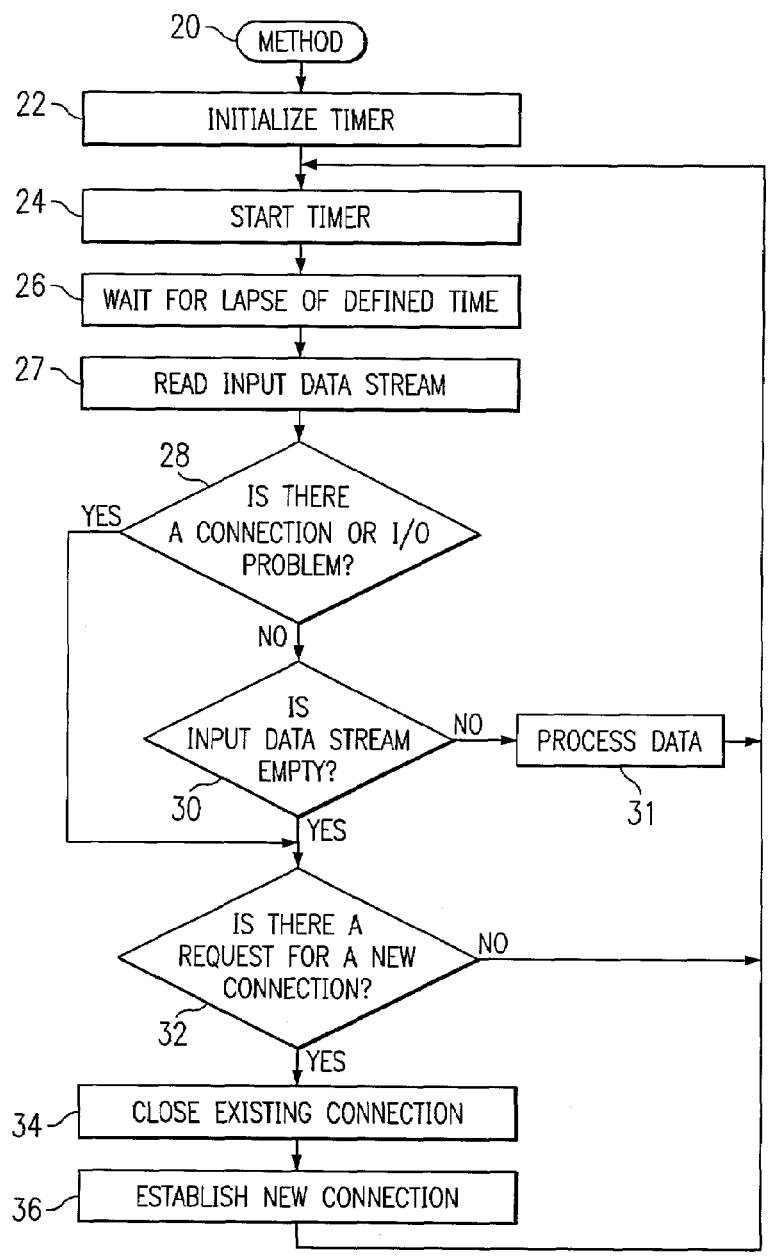
FIG. 2 is a flowchart of a method for monitoring a connection between a server and a passive client device according to an embodiment of the present invention.

The preferred embodiment of the present invention and its advantages are best understood by referring to FIGS. 1 through 2 of the drawings, like numerals being used for like and corresponding parts of the various drawings.

There is a desire for a system and method for monitoring a connection between a server and a client device, such as a passive TCP (Transmission Control Protocol) device. A passive TCP device does not provide status information, such as "heartbeats", to the server. As a result, the server may assume the connection is still valid when the client connection unexpectedly terminates. Therefore, the server may ignore new connection requests from the client device. In a preferred embodiment of the present invention, the server proceeds to establish a new connection with the passive client device if no data is being received from the passive client device via an existing connection or if it determines that there is a problem with the existing connection. The terms "client", "client device", "passive client device" and "passive TCP device" will be used interchangeably herein.

FIG. 1 is a block diagram of a client-server network 10 in accordance with an embodiment of the present invention. Network 10 comprises a client device 12 and a server 14.

Server 14 may comprise computer programs (not shown) that interact with a billing system 16. Client 12 provides data to server 14 via a TCP socket connection 18 established therebetween in accordance with a communication protocol, such as TCP. However, client 12 may be a passive client device that does not provide status information regarding client 12 and/or TCP socket connection 18 to server 14. Client 12 may monitor voice and/or data traffic of a remote system and may collect traffic data of the remote system. The collected data may be sent to server 14 for processing, for example by billing system 16 associated with server 14.

TCP/IP (Transmission Control Protocol/Internet Protocol) is a well-known protocol stack where TCP controls the data transfer and IP provides the routing through hardware connections between client 12 and server 14. A socket is an endpoint for communication between two devices, for example client 12 and server 14. In general, TCP messages may be sent and received by opening a socket at each end of a TCP connection and reading and writing data to and from the socket. Once TCP socket connection 18 between client 12 and server 14 has been established, it remains in place until explicitly closed by server 14, even if client 12 may become non-operational.

In general, in order to establish a connection, such as a TCP socket connection, between client 12 and server 14, client 12 transmits a connection request to server 14. A request for establishing a connection may not be immediately accepted upon receipt by server 14 for various reasons. For example, if there is an existing connection between the server and the client at a particular port, then a subsequent request for connection to the same port from the same client may not be accepted unless the existing connection is closed. Whenever a received request for connection cannot be immediately accepted, it is stored in a socket connection queue (not shown) of server 14. Server 14 may comprise a socket connection queue for each port.

FIG. 2 is a flowchart of a method 20 for monitoring a connection between server 14 and client 12 according to an embodiment of the present invention. Method 20 is preferably executed after a TCP connection between server 14 and client 12 is established. In step 22, a timer is initialized. Preferably, the timer is configured to a desired time period which determines the frequency with which the process starting at step 27 may be executed. If desired, the time period may be defined by a user, such as an operator, a system administrator, an end user, and/or the like. A timer parameter may be defined by the user through a user interface. If desired, the timer parameter may be defined by the user in a configuration file. In step 24, the timer is started. After the lapse of the defined time (step 26), an input data stream for TCP socket connection 18 between client 12 and server 14 is read (step 27). A socket timeout may be configured to define a maximum length of time to wait for input in the input data stream. In another embodiment, the use of a timer may be avoided. In such an embodiment, the method for monitoring a connection between server 14 and client 12 may start at step 27 and execute in a continuous loop.

In step 28, a determination is made as to whether there is a connection or I/O (Input/Output) problem. In the preferred embodiment, the presence of an IOException or a SocketException indicates a connection or I/O problem. An IOException signals an I/O problem which may be produced due to a failed or interrupted I/O operation. A SocketException signals the presence of an error in the underlying protocol, such as a TCP error. However, the invention is not so limited and other indications of a connection problem or an I/O problem may be used. If in step 28 it is determined that there is a connection or I/O problem, then the process starting at step 32 may be executed (described in more detail below). If in step 28 it is determined that there is no connection or I/O problem, then in step 30 a determination is made as to whether the input data stream is empty. An empty input data stream at server 14 may indicate an unexpected problem at client 12. If the input data stream is not empty, then data from the input data stream may be processed (step 31). For example, if the data relates to the amount of network traffic at the remote system, then the data may be converted into records usable by billing system 16. Billing system 16 may then create an invoice. The process starting at step 24 may then be executed to start the timer.

If in step 30 it is determined that the input data stream is empty, then the process starting at step 32 may be executed. In step 32, a determination is made as to whether client device 12 has sent a request for a new connection to server 14. The socket connection queue may be examined to determine whether a request for a new connection has been received. If no such request exists, then the process starting at step 24 may be executed to start the timer. If in step 32 it is determined that there is a request for a new connection, then in step 34, the existing connection is closed. In step 36, a new connection is established between client device 12 and server 14. The process starting at step 24 may then be executed to start the timer.

In the illustrated embodiment, server 14 closes an existing connection if the input data stream is empty or if there is a problem with the existing connection, provided that there is a request for a new connection. Thus, data loss that might otherwise occur due to non-acceptance of a new connection request by the server may be avoided.

The preferred embodiment of the present invention is implemented in software. Any programming language, such as Java, C++, C, and/or the like, now known or later developed, may be used for this purpose.

A pseudo code segment that may be used in an exemplary embodiment of the present invention is provided below:

```
While notDone {
    Try {
        Read data from input stream
        If no data {
            CheckforNewConnection
            If (newConnection exists) {
                CloseOldConnection
                ServeNewConnection
            }
        }
        else {
            ProcessData
        }
    } Catch (IOException, SocketException) {
        CheckforNewConnection
        If (newConnection exists) {
            CloseOldConnection
            ServeNewConnection
        }
    }
}
```

A sample code for checking for a new connection implemented in the Java language is provided below:

```
//---This method checks for new socket connection.
    public void checkforNewConnection( ) {
        try {
            //-- Try to accept new connection
            Socket newSocket = serverSocket_.accept( );
            //-- If successful, close the old connection and input stream
            inStream_.close( );
            socket_.close( );
            //-- Accept the new connection and set the new input stream.
            socket_=newSocket;
            InStream_=newBufferedInputStream(socket_.getInputStream( ));
            // -- Explicitly set a socket timeout since in Java,
            the default is no timeout (wait indefinitely)
            socket_.setSoTimeout(socketTimeOut_);
            System.out.println( "checkforNewConnection( ): New
            connection detected ");
        } catch (IOException ) {
            // -- Ignore the exception since this happens when no new
            connection request in the queue.
        }
    }
}
```

Although in the preferred embodiment of the present invention described above, server 14 waits for the lapse of a defined period of time before it checks for an empty input data stream, the invention is not so limited. In an alternative embodiment, the process starting at step 27 of the flowchart of FIG. 2 may be executed upon receiving a new connection request from client 12.

An advantage of an embodiment of the present invention is that it may be implemented without regard to the type of client being used. Moreover, data loss which might otherwise occur due to a faulty connection between the server and the client may be avoided. An advantage of another embodiment of the present invention is that the performance of the server is not adversely effected because a determination of the presence of a new connection request is made when there is no data in the input stream thereby avoiding unnecessary overhead.

What is claimed is:

1. A method for monitoring a connection between a server and a passive client device, comprising:
   continuously monitoring whether an input data stream of an existing connection between said server and said passive client device is empty, and if so, determining the presence of a request for a new connection between said server and said passive client device;
   closing said existing connection in response to the presence of said request for new connection; and
   establishing said new connection between said server and said passive client device.

2. The method of claim 1, further comprising processing data from said input data stream in response to said input data stream not being empty.

3. The method of claim 1, further comprising determining the presence of a problem in said existing connection.

4. The method of claim 1, further comprising determining the presence of at least one exception condition out of a plurality of exception conditions.

5. The method of claim 4, wherein said at least one exception condition is selected from the group consisting of an IOException and a SocketException.

6. The method of claim 1, further comprising receiving said request for said new connection from said passive client device.

7. The method of claim 1, further comprising storing said request for said new connection in a socket connection queue.

8. The method of claim 1, wherein said passive client device comprises a Transmission Control Protocol (TCP) device.

9. The method of claim 1, wherein said request for said new connection is a request for a new TCP connection.

10. The method of claim 1, wherein said existing connection is a TCP connection.

11. A method for monitoring a connection between a server and a passive client device, comprising:
    determining, after the lapse of a user-defined time period, whether an input data stream of an existing connection between said server and said passive client device is empty, and if so, determining the presence of a request for a new connection between said server and said passive client device in response to said input data stream being empty;
    closing said existing connection in response to the presence of said request for new connection; and
    establishing said new connection between said server and said passive client device.

12. The method of claim 11, further comprising processing data from said input data stream in response to said input data stream not being empty.

13. The method of claim 11, further comprising determining the presence of a problem in said existing connection.

14. The method of claim 11, further comprising determining the presence of at least one exception condition out of a plurality of exception conditions.

15. The method of claim 14, wherein said at least one exception condition is selected from the group consisting of an IOException and a SocketException.

16. The method of claim 11, further comprising receiving said request for said new connection from said passive client device.

17. The method of claim 11, further comprising storing said request for said new connection in a socket connection queue.

18. The method of claim 11, wherein said passive client device comprises a Transmission Control Protocol (TCP) device.

19. The method of claim 11, wherein said request for said new connection is a request for a new TCP connection.

20. The method of claim 11, wherein said existing connection is a TCP connection.

21. A method for monitoring a connection between a server and a passive client device, comprising:
continuously monitoring whether there is a problem in an existing connection between said server and said passive client device, and if so, determining the presence of a request for a new connection between said server and said passive client device;
closing said existing connection in response to the presence of said request for new connection; and
establishing said new connection between said server and said passive client device.

22. The method of claim 21, further comprising determining the presence of at least one exception condition out of a plurality of exception conditions.

23. The method of claim 22, wherein at least one of said plurality of exception conditions is selected from the group consisting of an IOException and a SocketException.

24. A method for monitoring a connection between a server and a passive client device, comprising:
determining, by said server without communicating with said passive client device, the presence of a problem in an existing connection between said server and said passive client device;
determining the presence of a request for a new connection between said server and said passive client device in response to the presence of said problem in said existing connection;
closing said existing connection in response to the presence of said request for new connection; and
establishing said new connection between said server and said passive client device.

25. The method of claim 24, further comprising determining the presence of at least one exception condition out of a plurality of exception conditions.

26. The method of claim 25, wherein at least one of said plurality of exception conditions is selected from the group consisting of an IOException and a SocketException.

27. A system for monitoring a connection, comprising:
a passive client device operable to generate a request for a new connection; and
a server operable to continuously monitor whether an input data stream of an existing connection between said server and said passive client device is empty, and if so, determining the presence of said request for new connection between said server and said passive client device, said server further operable to close said existing connection and establish said new connection between said server and said passive client device.

28. The system of claim 27, said server being further operable to determine the presence of a problem in said existing connection.

29. The system of claim 27, wherein said request for said new connection is a request for a new Transmission Control Protocol (TCP) connection and said existing connection is a TCP socket connection.

30. The system of claim 27, wherein said passive client device comprises a TCP device.

31. The system of claim 27, wherein said passive client device does not provide status information to said server, wherein said status information is selected from the group consisting of status information for said passive client device and status information for said existing connection.

32. A system for monitoring a connection, comprising:
a server operable to continuously monitor whether there is a problem in an existing connection between said server and a passive client device, and if so, determining the presence of a request for a new connection between said server and said passive client device, said server further operable to close said existing connection and establish said new connection between said server and said passive client device.

33. The system of claim 32, wherein said request for said new connection is a request for a new Transmission Control Protocol (TCP) socket connection and said existing connection is a TCP socket connection.

34. An application for monitoring a connection between a server and a passive client device, comprising:
application software resident on a computer-readable medium and operable to:
continuously monitor whether an input data stream of an existing connection between said server and said passive client device is empty, and if so, determining the presence of a request for a new connection between said server and said passive client device;
close said existing connection in response to the presence of said request for new connection; and
establish said new connection between said server and said passive client device.

35. The application of claim 34, said application software further operable to process data from said input data stream in response to said input data stream not being empty.

36. The application of claim 34, said application software further operable to determine the presence of a problem in said existing connection.

37. The application of claim 34, said application software further operable to determine the presence of at least one exception condition out of a plurality of exception conditions.

38. The application of claim 34, said application software further operable to receive said request for said new connection from said passive client device.

39. The application of claim 34, said application software further operable to store said request for said new connection in a socket connection queue.

40. A system for monitoring a connection between a server and a passive client device, comprising:
means for continuously monitoring whether an input data stream of an existing connection between said server and said passive client device is empty, and if so, determining the presence of a request for a new connection between said server and said passive client device;
means for closing said existing connection in response to the presence of said request for new connection; and
means for establishing said new connection between said server and said passive client device.

41. The system of claim 40, further comprising means for processing data from said input data stream in response to said input data stream not being empty.

42. The system of claim 40, further comprising means for determining the presence of a problem in said existing connection.

43. The system of claim 40, further comprising means for determining the presence of at least one exception condition out of a plurality of exception conditions.

44. The system of claim 40, further comprising means for receiving said request for said new connection from said passive client device.

45. The system of claim 40, further comprising means for storing said request for said new connection in a socket connection queue.

* * * * *